United States Patent [19]

Kurzius

[11] 3,876,815
[45] Apr. 8, 1975

[54] PROCESS FOR MAKING PRETZELS
[76] Inventor: Karl A. Kurzius, 9615 Cochiti S.E., Albuquerque, N. Mex. 87123
[22] Filed: Sept. 16, 1974
[21] Appl. No.: 506,452

Related U.S. Application Data
[63] Continuation-in-part of Ser. No. 396,086, Sept. 10, 1973, abandoned.

[52] U.S. Cl. .................. 426/499; 426/19; 426/21; 426/25; 426/143
[51] Int. Cl. ............................................. A21d 8/00
[58] Field of Search ............ 426/19, 21, 25, 27, 152, 426/500, 499, 143; 425/323; 99/90 R, 90 S

[56] References Cited
UNITED STATES PATENTS

| | | | |
|---|---|---|---|
| 1,722,677 | 7/1929 | Patterson et al. | 426/25 |
| 2,549,595 | 4/1951 | Gregor | 426/19 |
| 2,920,965 | 1/1960 | Ziegler et al. | 426/19 X |
| 2,955,040 | 10/1960 | Avera | 426/152 |
| 3,361,573 | 1/1968 | Reinertsen | 426/21 |
| 3,594,180 | 7/1971 | Hulse et al. | 426/25 |

FOREIGN PATENTS OR APPLICATIONS

| | | | |
|---|---|---|---|
| 21,227 | 3/1893 | United Kingdom | 426/152 |

OTHER PUBLICATIONS

Cookie and Cracker Technology, AVI Publishing Co., Inc., 1968, pp. 146-149, Matz, TX 772.M3.

Primary Examiner—S. Leon Bashore
Assistant Examiner—Marc L. Caroff
Attorney, Agent, or Firm—Richard A. Bachand

[57] ABSTRACT

A process for making soft pretzels includes the steps of mixing a pretzel dough, adding vinegar to the dough and shaping the dough into the desired pretzel shape. The shaping step is followed by partially baking the formed dough until it is cooked fully inside to a point at which further baking does not result in further expanded product. The baking is followed by cooling and quick-freezing. The frozen product is thereafter prepared for use by dampening, sprinkling with salt, and baking in a preheated oven until golden brown.

In another aspect of the invention, the process includes the further step of adding a flavor ingredient to the dough to produce a fully or partially baked flavored pretzel.

8 Claims, No Drawings

PROCESS FOR MAKING PRETZELS

Cross-Reference to Related Applications

This application is a continuation-in-part of copending application Ser. No. 396,086, filed Sept. 10, 1973, now abandoned.

BACKGROUND OF THE INVENTION

1. Field of the Invention

This invention relates to processes for making pretzels or the like, and more particularly to a process for making partially baked flavored pretzels of the soft type which can be stored for subsequent use.

2. Description of the Prior Art

In the baking art, two types of pretzels are widely enjoyed. The first is the hard pretzel, which is generally of dry, brittle consistency, often with a glossy finish. The other type is the soft type, which is generally quite soft inside, yet with sufficient body or texture to hold its pretzel shape. Usually, soft pretzels are of larger size than hard pretzels; for instance, a typical hard pretzel size is between about one-eighth to one-fourth inch in diameter (although some larger sizes can be made), and a typical soft pretzel size is between about ½ to 1¼ inches in diameter.

In the preparation of hard pretzels, although yeast is a commonly used ingredient, the dough is given a relatively short time to rise or "rest" between the time it is mixed and the time it is cooked. See, for example, *COOKIE AND CRACKER TECHNOLOGY*, AVI Publishing Co., Inc., p. 146-149 (1968).

On the other hand, soft pretzels have been made in a process which typically includes a step of mixing ingredients, commonly flour, yeast, water, and salt. After the ingredients are mixed into a dough, the dough is allowed to rest for a time considerably longer than than the hard pretzel dough in order to allow the yeast to react and the dough to rise. After the dough has risen, it is divided into portions, which are rolled and formed in the desired pretzel shape. The individual uncooked pretzels are then commonly subjected to an air stream to cause the outside crust to stiffen. The pretzels are then dipped in lye to give the pretzel the desired shine, crispy texture, and brown color upon baking. Finally, the pretzels are salted and baked, typically for approximately 15 minutes at a temperature of about 450°F.

Ordinarily, soft pretzels made in accordance with the above typical process remain fresh for a relatively short period of time; afterwards they become stale, dry, and become, in general unappetizing.

The soft pretzel dough, nevertheless is considerably different, for example, than roll dough, since it is considerably stiffer to permit its forming and shaping.

Additionally, the ordinarily soft pretzels made in accordance with the above typical process cannot accept flavor ingredients, particularly, natural ingredients, such as chili, onion, peanut butter, and the like. In the usual pretzel dough, if a flavor ingredient is added, the consistency of the dough is rendered totally workable. The dough becomes crumbly and cannot be formed or worked into any meaningful shape. Furthermore, since the pretzel dough is allowed to ferment or rest for such long times, as mentioned above, the flavor ingredients tend to become rancid during the fermentation period. This is because if natural ingredients, such as peanut butter, salami, or the like are added in sufficient quantity to achieve the desired flavor, the ingredient, especially peanut butter, turns sour through fermentation when the dough is rising through reactions with the yeast. Thus, the resulting flavor of the product is unsatisfactory.

This is true even in hard pretzels. For instance, in Ziegler, U.S. Pat. No. 2,920,965, a process is presented to achieve a cheese flavor in a hard pretzel without adding any cheese whatsoever. Although this is an extreme case, it does illustrate the efforts to minimize the quantity of flavor ingredients in the dough which have been heretofore required.

Finally, becoming of increased popularity are products which are partially or incompletely baked and frozen for subsequent heating by the user. The consumer therefore is enabled to prepare whatever portion or quantity of the product, as needed, and to keep the unused portion frozen until use is desired, at which time additional fresh quantities of the product can be prepared. For example, commonly rolls are prepared to be "brown and served." In the *Frozen Food Cookbook* by Simpson, ARI Publishing Co., Inc., Westport, Conn., at page 172, for instance, a process for partially baked and frozen rolls is set forth. The rolls are baked until they are not quite fully risen, but baked to the center, and are frozen to be kept for later use. The rolls are subsequently thawed ad baked for 5 to 10 minutes until browned.

A similar process has been proposed for making pizza by Tangel et al., U.S. Pat. No. 3,615,679 in which pizza is formed in a partially cooked state and frozen, and is storable in a freezer until ready for use. For use, the partially cooked pizza is heated in a toaster to complete the cooking, and to produce a hot and appetizing pizza.

Although such partially baked or cooked products are known, the partially cooked processes proposed in the prior art for other products, such as the rolls and pizza, above mentioned, would not be suitable for use in making soft pretzels. This is because in the typical pretzel process, the dough, after it has risen, is essentially in a sponge-like form in which a large number of bubble holes from the yeast are present in the dough. This sponge effect upon partial cooking, freezing, and subsequent heating robs the moisture from the product, especially from the outer crust, and a dry, unplatable product results.

SUMMARY OF THE INVENTION

In the light of the above, it is an object of the invention to present a process for making pretzels.

It is another object of the invention to present a process for making soft pretzels which can be stored or kept for relatively long periods of time.

It is still another object of the invention to present a process for making soft pretzels which can be flavored with natural food ingredients.

It is still another object of the invention to present a process for making soft pretzels which can be maintained or stored in a refrigerator or freezer and heated for use.

It is still another object of the invention to present a process for making partially baked soft pretzels which can be stored for subsequent completion baking and use.

These and other objects, features, and advantages will become apparent to those skilled in the art from the following detailed description when read in conjunction with the accompanying drawing and appended claims.

In one aspect of the invention, a process is presented for making soft pretzels, in which approximately 31.22% water, 1.95% Yeast, 1.46% Salt, 1.46% sugar, 0.99% shortening, 62.44% flour, 0.24% powdered milk, and 0.24% vinegar are added, by weight, to form a dough. A flavor ingredient is then added to the pretzel dough mixture in an amount of approximately 20% by volume of the dough. The dough is mixed for approximately three minutes and formed into the desired pretzel shape. The formed dough is then refrigerated for approximately 30 minutes at a temperature of about 32°F., and dipped into a solution including sodium hydroxide. The dough is then partially baked at approximately 550°F. for about 7 minutes, or until further baking produces no further expansion of the dough. The dough is then frozen. The frozen dough can be subsequently prepared for eating by baking for about one to two minutes at a temperature of about 450°F.

DESCRIPTION OF THE PREFERRED EMBODIMENT

In a preferred embodiment of the invention, the following ingredients are mixed in the following ratios by weight to form a pretzel dough:

| Water | 31.22% |
|---|---|
| Flour | 62.44% |
| Yeast | 1.95% |
| Salt | 1.46% |
| Sugar | 1.46% |
| Shortening | 0.99% |
| Vinegar | 0.24% |
| Powdered milk | 0.24% |

Thus, for example, in a typical pretzel process, in accordance with the invention, the following weights of ingredients can be used:

| Water | 4 lb. |
|---|---|
| Flour | 8 lb. |
| Yeast | 4 oz. |
| Salt | 3 oz. |
| Sugar | 3 oz. |
| Shortening | 2 oz. |
| Vinegar | 0.5 oz. |
| Powdered milk | 0.5 oz. |

It should be understood that the percentages and weights, or baking and cooking times, below described are approximate, and can be modified for individual tastes and preferences of the final product. For example, the ingredients, except for the vinegar and powdered milk are essentially the same as those used in prior art pretzel recipes. The powdered milk is merely a flavor preference, but the vinegar qualities to the dough which enable the partial bake and flavor acceptance capability, as below described. Thus, the typical ingredients can be modified in amount in accordance with individual recipes, and also additional ingredients of individual recipes can be added, if desired.

The ingredients are mixed to form the basic dough from which the pretzels are formed. The basic dough is mixed or agitated for approximately 2½ to 3 minutes to evenly blend the ingredients together.

The dough is then immediately scaled to the proper weight with no rest period or "floor time," and is divided into the desired units, for example, by hand or by a cutting machine, and rolled into a form suitable for twisting into the desired pretzel shape, such as a stick shapae or the like, or coiled into the usual pretzel shape, such forming processes being well known in the art and not described herein in detail.

The raw pretzel portions are then placed upon a tray, board, or the like, and refrigerated at a temperature of 32°F. for approximately 30 minutes to produce a degree of dough stiffness for handling ease and for a better subsequent baking process. It should be pointed out that prior to the refrigeration step, no "floor time" or rest period for the dough is required. Also, in contradistinction to the prior art processes, the rest period for the short time is done at a cold temperature. Thus, prior to the baking step, the yeast is not permitted to rise, contrary to the typical pretzel processes.

The pretzels then are removed from the refrigerator and each dipped or sprayed with a solution of lye. The solution can conveniently be sodium hydroxide solution which is formed in a diluted mixture consisting essentially of one pound of sodium hydroxide powder to 40 pounds of water. The solution produces a pleasant pretzel taste, crust, coloring, and shine for appearance. Each pretzel is then placed upon a baking pan or screen.

At this point it should be noted that the baking can be, and preferably is, done without salting the pretzel product. To achieve the partially baked product, the salt will be applied by the user immediately prior to his browning, as below described.

The raw pretzels are then baked for between 5 and 10 minutes, preferably about 7 minutes at a temperature of between 500°F. and 600°F., preferably about 550°F. The period and temperature of baking may vary slightly within the ranges set forth with altitude, barometric pressure, and so forth, the primary object being to fully bake the pretzel inside to thereby destroy any remaining yeast bacteria. Further baking, therefore, will not result in an expanded product, and the partially baked product will exhibit a light golden brown color. It should be noted that this baking period is considerably shorter and at a higher temperature from the prior pretzel process, and is, hereafter referred to as the "quickbake" or the "partial bake" step.

After the pretzels have been partially baked, they are allowed to cool for approximately 15 minutes, and are, if desired, packaged. The pretzels are then quick frozen by placing them in a refrigerator at a temperature of approximately −10°F. In the pretzel mixture, the vinegar operates to enable the pretzel product to be baked without the previously required "floor time." Since no "floor time" is required, after the chilling or refrigerating step, which is only for the purpose for handling ease and enhanceing the baking process, the pretzels can be immediately "quick baked." The yeast within the pretzel product then rises only during this "quick bake" or "partial bake" step. It is the addition of the vinegar also which enables the flavor ingredient to be added to the pretzel dough mixture, as below described. It should be noted that the vinegar proportion in the recipe may be varied slightly, depending upon the ratio of the other ingredients, to achieve the desired pretzel product. It has been found, for instance, that the ratio of the vinegar required may vary from approximately between 0.12% and 0.99% by weight of the pretzel dough. Also, because of the particular way of which the pretzels are formed, including the addition of the vinegar to the dough it has been found that the frozen product can be removed from the freezer, defrosted completely, and subsequently refrozen with little harm to the product.

To prepare the frozen pretzels for eating, the user preheats the oven to a temperature of about 450°F. The partially baked pretzels are placed upon a baking pan and dampened slightly with water, and, if desired, sprinkled on top with salt. The pretzels are then baked in the oven for 1 to 2 minutes until golden brown. It has been found, that the process, above described, produces a pretzel which has a shelf-life with little or no flavor or quality lost for a period of about a year when frozen.

It has been found that due to the particular manner of preparation, with no "floor time" being required, flavor ingredients can be added if desired to the dough to produce a flavored pretzel, without the pretzel becoming sour or rancid. Also, because the vinegar is present in the dough, in addition to obviating the need for allowing the dough to rest or rise, the dough can accept considerable quantities of flavor ingredients without affecting the consistency of the pretzel dough, since the vinegar opens the gluten in the flour. For example, prior to the mixing step above described, a flavor ingredient can be mixed in an amount of between 2 and 25% by volume of the basic dough. Typical flavor ingredients which may be used are diced onions, cheese, such as cheddar cheese, garlic, green chili, peanut butter, salami, or the like. Since the yeast is not allowed to rise, except in conjunction with the cooking process itself, the flavor ingredient will not ferment or otherwise react with the yeast, and the resulting product will retain the natural flavor ingredient taste.

The flavor ingredient can be added in conjunction with the partially baked process, as above described. Alternatively, the flavor ingredient can be added, and the baking process completed, for example, by continuing the baking until the product is fully cooked to exhibit the desired brown color. If the product is prepared in accordance with the partially baked process above described, the shelf life with the additional flavor ingredient is not appreciably affected.

Although the invention has been described and illustrated with a certain degree of particularity, it is understood that the present disclosure is made by way of example only, and that numerous changes in the combination and amounts or quantities of ingredients and in the cooking or baking times may be resorted to without departing from the spirit and scope of the invention as hereinafter claimed.

What is claimed is:

1. A process for making flavored, soft pretzels, consisting essentially of: adding together water, yeast, salt, sugar, shortening, flour, powdered milk, and vinegar, to form a dough; adding a flavor ingredient to the dough; mixing said dough for about 3 minutes;
   forming a portion of said mixed dough into a desired pretzel shape;
   refrigerating the formed dough for about 30 minutes at a temperature of about 32° F.;
   dipping the refrigerated dough into a solution including sodium hydroxide;
   baking the dipped dough at about 550° F. for about 7 minutes, whereby further baking produces no further expansion of the dough;
   freezing the baked dough, whereby said dough can then be prepared for eating by baking for about 1 minute at a temperature of about 450° F.

2. The process of claim 1 wherein said ingredient is chili.

3. The process of claim 1 wherein said ingredient is onion.

4. The process of claim 1 wherein said ingredent is garlic.

5. The process of claim 1 wherein said ingredient is cheddar cheese.

6. The process of claim 1 wherein said ingredient is salami.

7. The process of claim 1 wherein said ingredient is peanut butter.

8. The process of claim 1 wherein the dough contains approximately, by weight, 31.22% water, 1.95% yeast, 1.46% salt, 1.46% sugar, 0.99% shortening, 62.44% flour, 0.24% powdered milk, and 0.24% vinegar; and wherein the flavor ingredient is added in an amount of between 2% and 25% by volume of the dough.

* * * * *